(12) United States Patent
Vaghani et al.

(10) Patent No.: US 8,499,004 B2
(45) Date of Patent: Jul. 30, 2013

(54) FILE SYSTEM WITH OPTIMISTIC I/O OPERATIONS ON SHARED STORAGE

(75) Inventors: Satyam B. Vaghani, San Jose, CA (US); Murali Vilayannur, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 13/587,713

(22) Filed: Aug. 16, 2012

(65) Prior Publication Data

US 2012/0310909 A1  Dec. 6, 2012

Related U.S. Application Data

(63) Continuation of application No. 12/784,249, filed on May 20, 2010, now Pat. No. 8,260,816.

(51) Int. Cl.
*G06F 17/30* (2006.01)
(52) U.S. Cl.
USPC ........... 707/781; 707/688; 707/694; 707/703; 707/704; 707/822

(58) Field of Classification Search
USPC .................................................. 707/600–899
See application file for complete search history.

(56) References Cited

U.S. PATENT DOCUMENTS

2011/0225367 A1* 9/2011 Rajvanshy et al. ........... 711/118

* cited by examiner

*Primary Examiner* — Isaac M Woo

(57) ABSTRACT

A method for performing I/O operations on a file stored in a file system utilizing a shared data storage system and accessible by a plurality of host computers is disclosed. A host computer receives from a process executing on it, a request to read data stored in the file. The host computer then requests the data stored in the file without acquiring a lock from the file system. The host computer also maintains a timeout value associated with the file while reading the data. The host computer receives at least a portion of the data prior to an expiration of time, and if all the data has not been received before the expiration of time, it then assesses whether another of the host computers has acquired a lock on the file, and, if so, invalidates the received data without providing it to the requesting process.

20 Claims, 9 Drawing Sheets

FILE SYSTEM WITH OPTIMISTIC I/O OPERATIONS ON SHARED STORAGE

BACKGROUND

This application is a continuation of and claims the benefit of U.S. patent application Ser. No. 12/784,249 filed on May 20, 2010, now issued as U.S. Pat. No. 8,260,816 on Sep. 4, 2012 and entitled "Providing Limited Access to a File System on Shared Storage" which is hereby incorporated by reference.

BACKGROUND

Clustered file systems include enterprise storage file systems that are shared (i.e. accessible for reading and writing) by multiple computer systems often referred to as hosts. One example of such a clustered file system is VMware's Virtual Machine File System, ("VMFS"). The VMFS enables multiple applications (e.g., virtual machines, database instances, etc) instantiated on one or more physical servers or hosts to mount and use a common file system where data storage is implemented on a shared data storage system. An example of a shared data storage system is a disk array accessible through a storage area network ("SAN"). A typical data storage system is a physically independent enclosure containing a storage system manager (e.g., a disk array controller), a disk cache (e.g, a non-volatile RAM based cache), and multiple physical data storage units (e.g., disk drives). The storage system manager manages the physical data storage units and exposes them to the hosts as logical data storage units, each identified by a logical unit number ("LUN"), enabling storage operations to be carried out on the LUNs using storage hardware.

Clustered file systems provide a desirable multi-host input/output ("IO") architecture because they can service multiple parallel IO streams from multiple hosts directly to the same shared file system volume on shared storage. However, many file operations on clustered file systems are costlier than they would be on local non-clustered systems. Many file operations require manipulation of file system metadata. When performed in clustered file systems, such manipulations require concurrency control mechanisms that provide some form of notification of the events to other participant hosts in the cluster to prevent multiple hosts accessing the shared storage system from simultaneously modifying the same file system resources, thereby causing data corruption and unintended data loss. These notifications incur IO-class latencies, and therefore the file operations are costlier than those on local non-clustered file systems that do not require such cross host notifications.

One such concurrency control mechanism uses the notion of acquiring locks corresponding to file system resources (e.g., directory contents, file descriptors, data block bitmaps, etc.) prior to acting upon such file system resources.

One example of a method for acquiring locks, itself, involves the host "reserving" the data storage unit (e.g., LUN) upon which a special data structure known as a lock and corresponding file system resource governed by the lock resides, such that only said host has exclusive read and write access to the data storage unit. After acquiring the desired lock via a combination of read and write operations, said host releases its reservation, thereby freeing the data storage unit to service other hosts sharing the data storage unit. In an architecture where the computer systems are connected to a SAN by a Small Computer System Interface ("SCSI") and execute IO operations to the LUN using SCSI commands, one example of such a reservation system is the conventional SCSI reservation command that can be issued by a file system to a LUN in the SAN on behalf of a process running on a connected computer system, as described in application Ser. No. 10/773,613 ('613 application).

Reserving the data storage unit to acquire a desired lock prevents multiple hosts from simultaneously trying to acquire the same lock. Specifically, without reserving the data storage unit, two competing hosts could both read a lock simultaneously, determine that the lock is free, and then both write the lock to acquire it (e.g., write a unique host identifier value to an ownership field in the lock). Each process would conclude that it had successfully acquired the lock and access the lock's corresponding file system resource or data, causing data loss and corruption. Thus, this locking system prevents multiple processes from modifying data concurrently and causing data loss and corruption. Other cluster file system locks, such as network based locks and locks that include a combination of network and on-disk locks also prevent multiple hosts from concurrently modifying data and causing data loss and corruption. However, acquiring locks can be a significant bottleneck when it is performed for each file open and each IO to small files hosted on such a clustered file system. When a system, for example a Virtual Machine, is powering on or making other power state change operations, there are numerous small files that need to be opened and read. Many of the file open and IO requests are for data read only. It would be useful to have a system that would reduce clustered file system locking overhead for common file system operations, such as opening files, read only IO to small files, and closing files that may be performed safely without acquiring a lock.

SUMMARY

Systems and methods for accessing data in a file system on shared storage are disclosed. One such method relates to performing I/O operations on a file stored in a file system utilizing a shared data storage system and accessible by a plurality of host computers wherein any of the host computers are capable of acquiring a lock from the file system to exclusively access the file. In accordance with the method, a host computer receives from a process executing on it, a request to read data stored in the file. The host computer then requests the data stored in the file without acquiring a lock from the file system to access the file. The host computer also maintains in its memory a timeout value associated with the file while the data is being read by the host computer. The host computer receives at least a portion of the data prior to an expiration of time as indicated by the timeout value, and if all the data has not been received by the host computer before the expiration of time, then it assesses, upon the expiration of time, whether another of the host computers has acquired a lock on the file, and, if so, invalidates the received data without providing the received data to the requesting process.

DETAILED DESCRIPTION

The invention can be implemented in numerous ways, including as a process, an apparatus, a system, a composition of matter, a computer readable medium such as a computer readable storage medium. In this specification, these implementations, or any other form that the invention may take, may be referred to as techniques. A component such as a processor or a memory described as being configured to perform a task includes: i) a general component that is temporarily configured to perform the task at a given time; or ii) a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
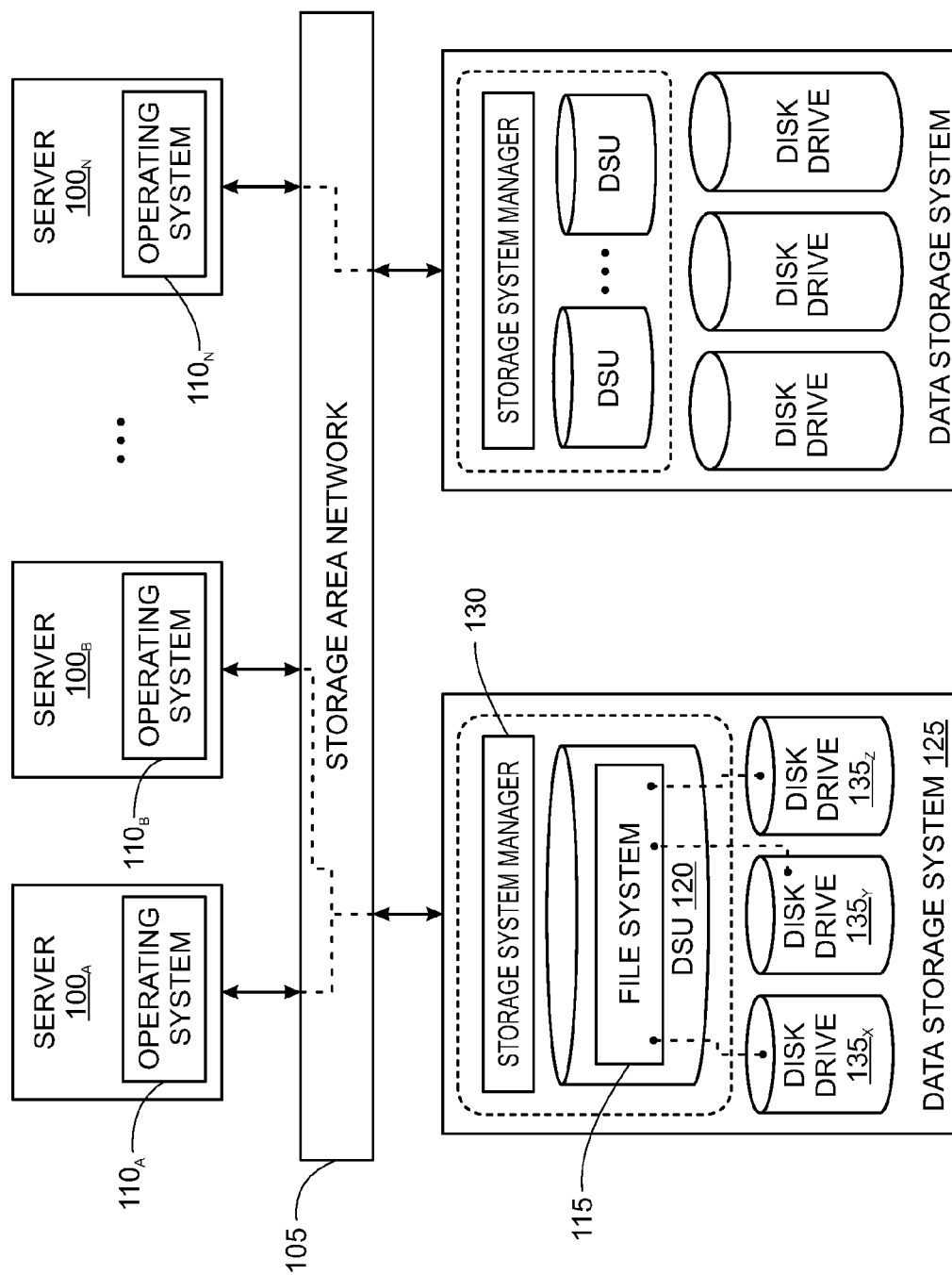
FIG. 1 illustrates one example of a prior art computer system configuration utilizing a clustered file system.

FIG. 1 illustrates one example of a prior art computer system configuration utilizing a clustered file system in which one or more embodiments of the invention may be useful. The computer system configuration of FIG. 1 includes multiple servers $100_A$ to $100_N$, each of which is connected to SAN 105. Operating systems $110_A$ and $110_B$ on servers $100_A$ and $100_B$ interact with a clustered file system 115 that resides on a data storage unit (DSU) 120 accessible through SAN 105. In particular, data storage unit 120 is a LUN of a data storage system 125 (e.g., disk array) connected to SAN 105. While LUN 120 is exposed to operating systems $110_A$ to $110_N$ by system storage manager 130 (e.g., disk controller) as a contiguous logical storage space, the actual physical data blocks upon which shared file system 115 may be stored is dispersed across the various physical disk drives $135_X$ to $135_Z$ of data storage system 125.

Clustered file system 115 contains a plurality of files of various types, typically organized into one or more directories. The file system 115 further includes metadata data structures that specify information about file system 115, such as block bitmaps that indicate which data blocks in file system 115 remain available for use, along with other metadata data structures indicating the directories and files in file system 115, along with their location. Sometimes referred to as a file descriptor or Mode, each file and directory also has its own metadata data structure associated therewith, specifying various things, such as the data blocks that constitute the file or directory, the date of creation of the file or directory, etc.

Figure 2:
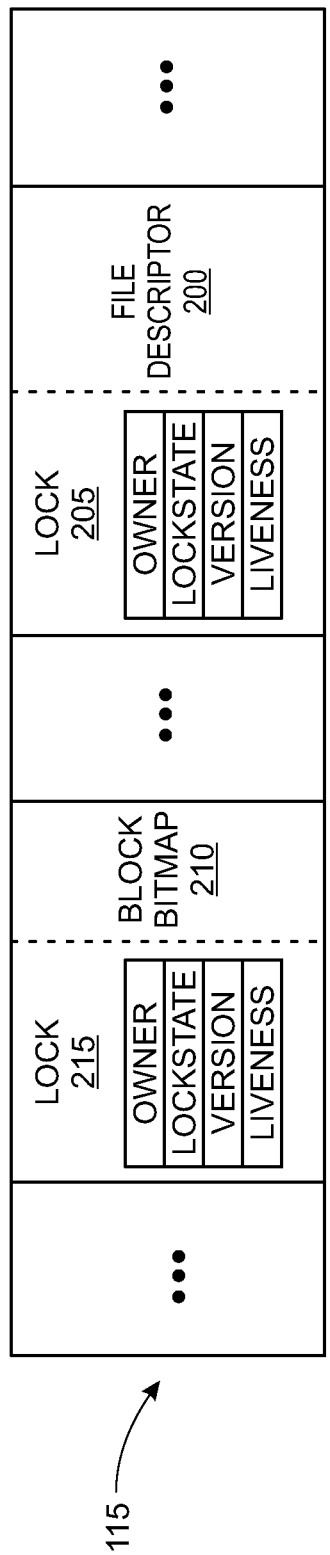
FIG. 2 is a diagram illustrating an example of a prior art file system resource lock and the file descriptor or Mode for a file.

FIG. 2 is a diagram illustrating an example of a prior art locks for file system resources and the file descriptor or Mode for a file as is described in '613 application and in U.S. patent application Ser. No. 11/676,109 ('109 application). As depicted in FIG. 2, these metadata data structures are stored in file system 115 and each have an associated lock. For example, to gain access to file descriptor 200, server $100_A$ needs to acquire its respective lock 205. Similarly, to gain access to block bitmap 210, server $100_A$ needs to acquire its respective lock 215.

Each of lock 205 and 215 includes an owner field, lockstate field, version field, and liveness field. The owner field is used to identify a server, such as $100_A$ to $100_N$, that owns or possesses a lock at a given point in time. Each of servers $100_A$ to $100_N$ may be assigned a unique ID value, which can be inserted into a lock's owner field to indicate that the server owns the lock. A value of zero in the owner field indicates that the lock is not currently owned by any server (although other values may also be used for this purpose). The version field of a lock may be one of a number of different values, where the current value in the version field (i.e., the current version) indicates a temporally unique current state of the lock. Each time a lock is acquired or released, its version field is incremented as an atomic part of the lock acquisition and release process. It follows that the version field is useful to distinguish multiple acquisitions of a given lock by the same host at different points in time as being distinct from each other. The liveness field indicates whether the current owner of the lock as determined by the owner field is powered on and actively using the lock. The actual update of a liveness field may be achieved in a number of ways, including as described in 613 application and '109 application.

Figure 3:
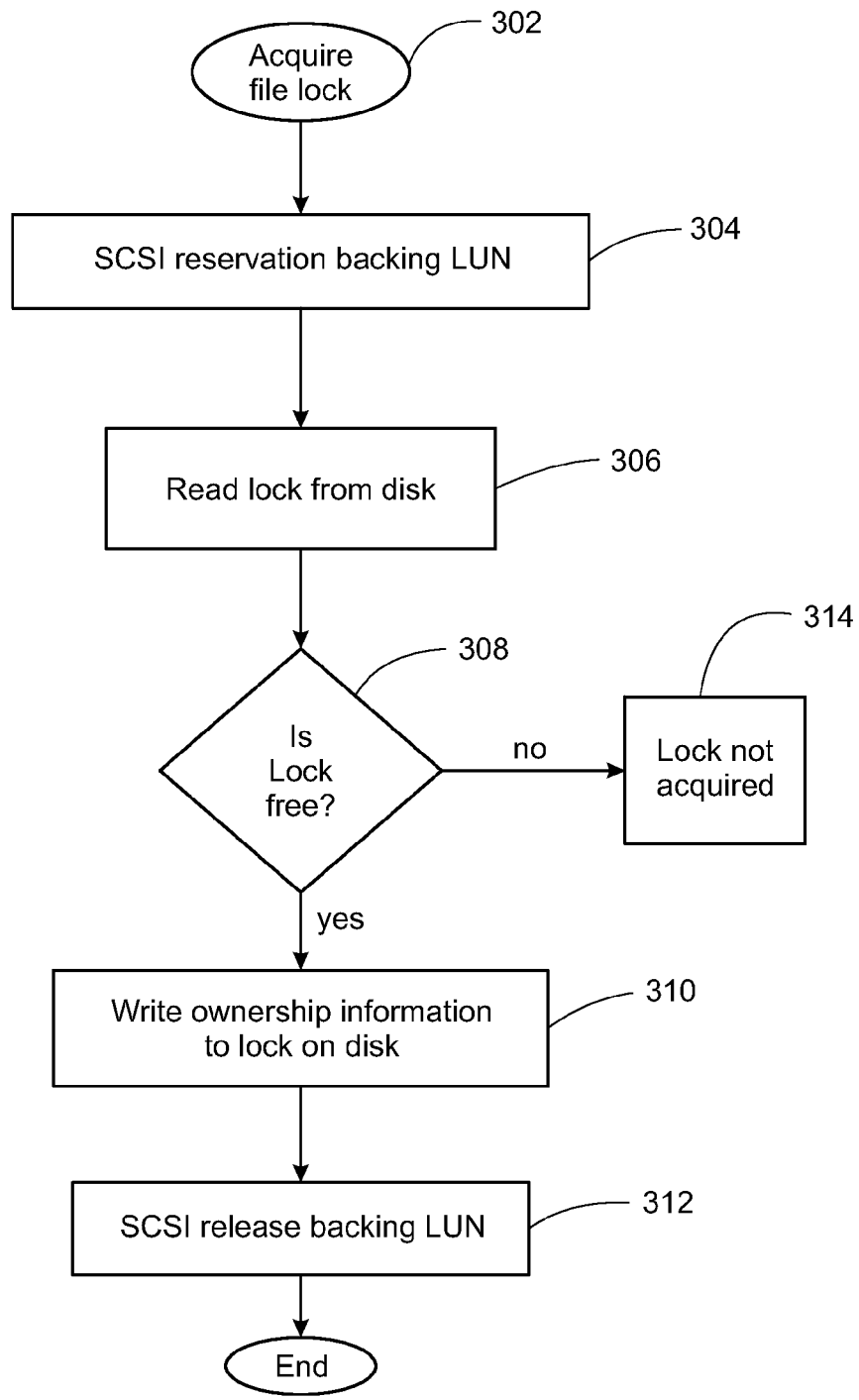
FIG. 3 is a flow chart illustrating a prior art set of steps for using the SCSI reservation based method to acquire an on-disk lock.

FIG. 3 is a flow chart illustrating a simplified set of steps for using the SCSI reservation based method to acquire an on-disk lock such as lock 205 as described in '613 application. This example is provided as an illustration of one method for acquiring a lock, and is not meant to be a limitation on the patented method. The patented invention applies equally well to other locking mechanisms for clustered file systems, such as network based locks, combinations of network based locks and on-disk locks and other methods of acquiring locks. Although the invention is described in connection with clustered file systems, the invention may be implemented in connection with other file systems for which a lock must generally be acquired to enable read/write access to file system resources.

As shown at 304 in FIG. 3, the file system lock manager running in operating system 110 uses SCSI reservation to establish exclusive read and write access to the underlying data storage unit 120. At 306, the lock 205 is read from the data storage unit. When the lock is read from data storage unit, the owner and liveness information of the lock is checked. At 308 a determination is made based on the owner and liveness information about whether the lock is free, as further described in the '613 application and the '109 application. If the lock is free, the host may establish itself as the owner by writing to the relevant lock fields on disk, as shown at 310, and releasing the SCSI reservation, as shown at 312. This type of SCSI reservation command locks out other hosts from doing IO to the entire LUN, while the host issuing the reservation was really interested in locking out other hosts from doing IO to a particular data structure, i.e. lock 205, on the LUN. If the lock is not free, the lock is not acquired at that time.

Figure 4:
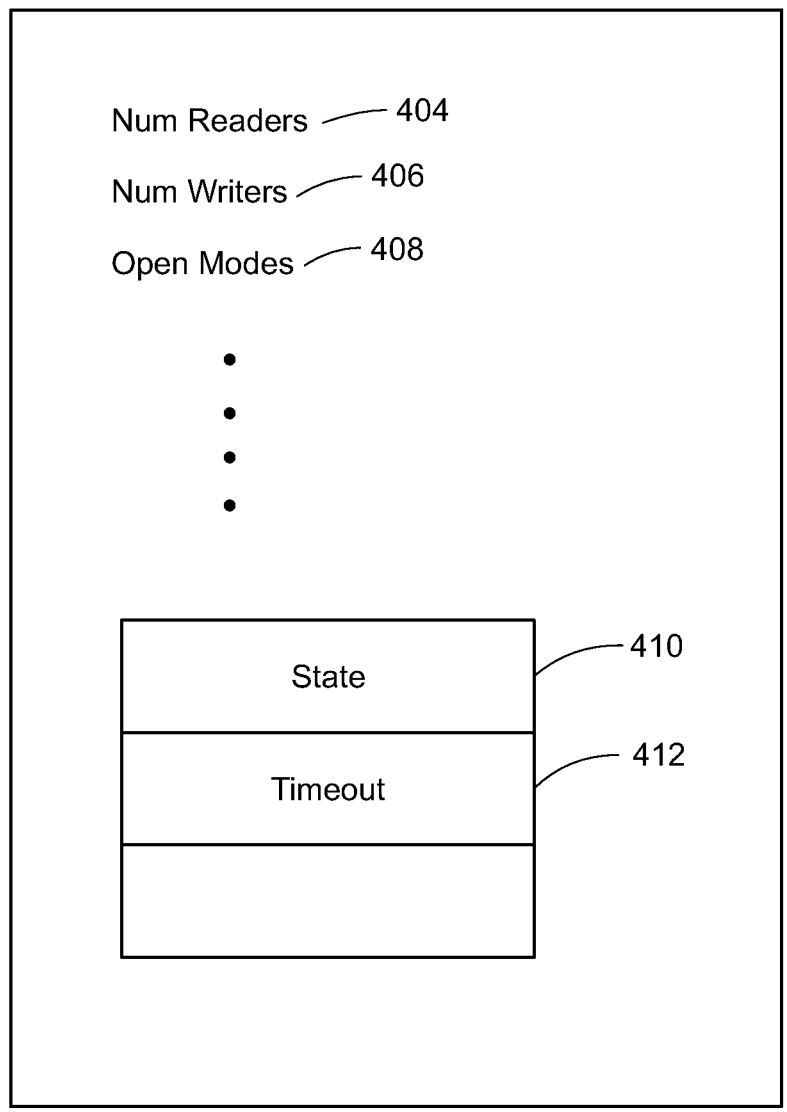
FIG. 4 is an illustration showing an embodiment of a data structure with in-memory state for a file held open by an OS kernel, also referred to as the in-memory Mode or file descriptor for the file.

FIG. 4 is an illustration showing an embodiment of a data structure with in-memory state for a file held open by an OS kernel 110, also referred to as the in-memory Mode or file descriptor for the file. As is well known in the art, the OS kernel stores an Mode data structure in memory for every file that it holds open. In some embodiments, the file Mode may be used to implement an optimistic IO lease or limited lease on a file. Fields 404, 406, and 408 are examples of general fields normally included in the in-memory Mode for a file. An additional field may be added to the file Mode for implementing the optimistic IO lease on the file to indicate the optimistic IO state of the file, as illustrated at 410. The state of the file may include whether it is in a REGULAR IO state, whether it is in an OPTIMISTIC IO state, whether it is in a TIMEDOUT state or whether it is in a DEAD state. Descriptions of these states are provided below. One method for indicating the state of an open file is to assign an atomic integer that can assume the values from the set {REGULAR IO, OPTIMISTIC IO, TIMEDOUT, DEAD} and store the integer in the state field at 410. An additional field may also be added to the file Mode to provide a predetermined amount of time after which an optimistic IO lease of the file will expire, as illustrated at 412.

Figure 5:
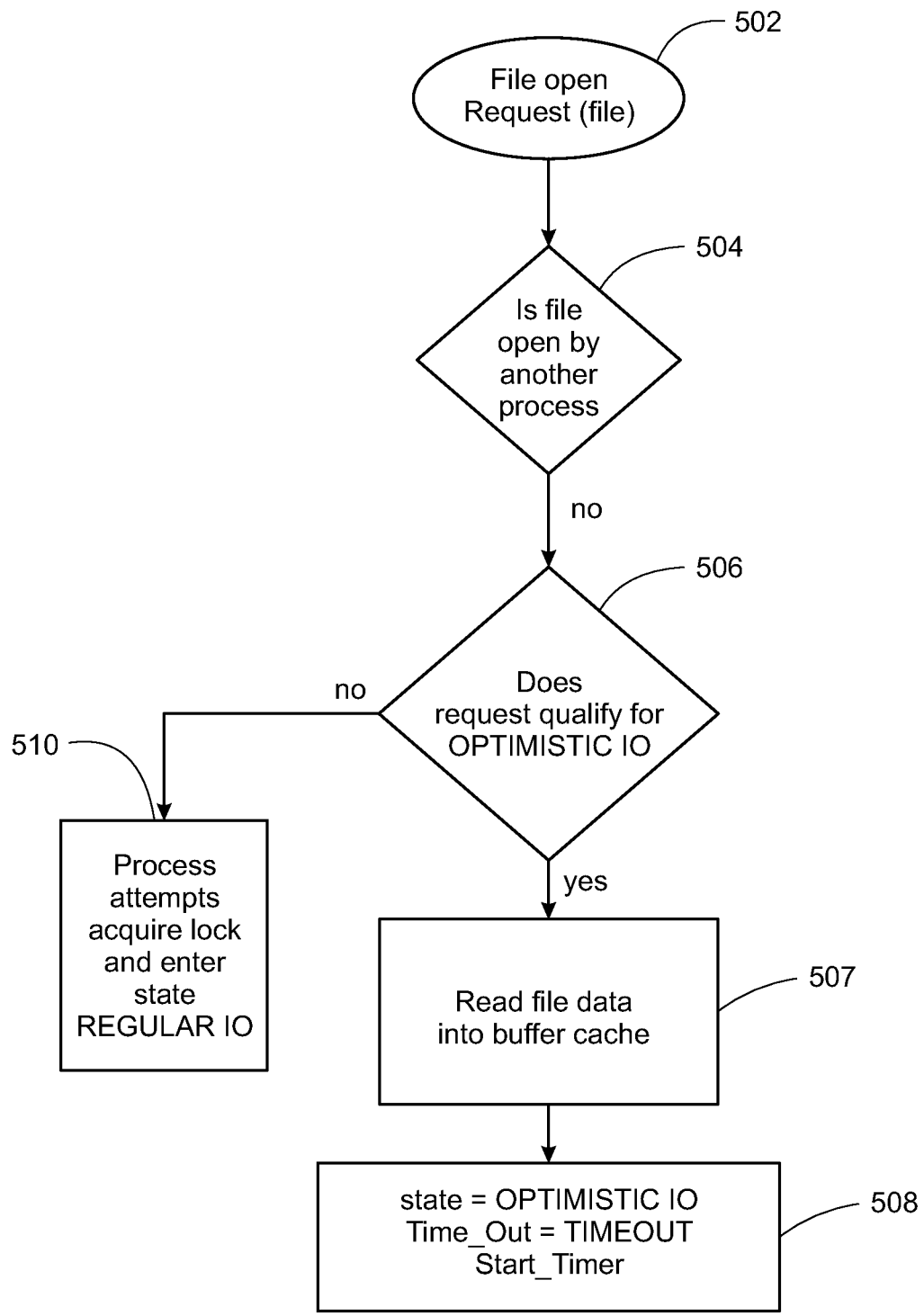
FIG. 5 is a flow chart illustrating an embodiment of opening a file and acquiring an optimistic IO lease or limited lease on the file.

FIG. 5 is a flow chart illustrating an embodiment of opening a file, such as the one represented by file descriptor 200, and acquiring an optimistic IO lease on the file. Once the file open request is received by operating system 110 from a process running on server 100, it is determined whether the file is already open by another process on server 100 at step 504. This step 504 is already typically performed by conventional operating systems. In the event that the file is not already opened by another process, it is determined whether the file meets the qualification for optimistic IO at step 506. Step 506 is illustrated in more detail in FIG. 6 and discussed in more detail below. If the file qualifies for optimistic IO, the file is read into the buffer cache of the operating system at 507 and the file Mode state field 410 and timeout field 412 are set at 508 as:

STATE=OPTIMISTIC IO
TIMEOUT=TIMEOUT SETTING

As shown above in the discussion of FIG. 4 at 410 and 412, one embodiment for setting the file state and timeout is to include fields for these values in the file Mode. As discussed above, the TIMEOUT SETTING is a predetermined time period after which the optimistic IO lease will expire. It is preferable to set TIMEOUT SETTING to a time period that is greater than the time a majority of the processes running on operating system 110 will keep a majority of their files open, although this is not meant to be a limitation on the patented method. The patented invention applies equally well to other choices of TIMEOUT SETTING. At 508, a timer is started so that it may be determined when the timeout period has been reached, and thereby when the optimistic IO lease should expire. Once this process is finished, the process requesting the file maintains an optimistic IO lease on the file until the timeout period has been reached and the file is considered opened by that process in OPTIMISTIC IO state. The method of FIG. 5 may be implemented without incurring certain IO latencies, which would otherwise be required, and which vary for different embodiments of the invention. For example, in an embodiment in which SCSI reservations are used to acquire on-disk file system resource locks, such as described in '613 application, acquiring a lock for read/write access may require the use of SCSI reservations and IO operations for reading and writing lock metadata, as indicated in steps 304, 306, 310 and 312 of FIG. 3. In contrast, the method of FIG. 5 could be implemented in such a system to obtain an optimistic IO lease to enable non-exclusive read access to the file, without any of these SCSI reservations and lock metadata IO operations.

If the file does not qualify for optimistic IO at 506, then at 510, the process requesting the file attempts to acquire a lock on the file using traditional methods, an example of which is illustrated in FIG. 3 above. If the lock is acquired, the file is considered opened in REGULAR IO state, and the state is set to REGULAR IO. When the file is in the REGULAR IO state, the file is now serviced using regular IO algorithms. In one embodiment, the state field 410 of the file Mode would be set to REGULAR IO. In REGULAR IO, the timeout field is unnecessary, and it therefore does not matter what the timeout field 412 is set to.

If at step 504 it is determined that the file is already opened by another process, then in some embodiments, the file is checked to determine if the file is opened in OPTIMISTIC IO state. In the event that the file has already been opened in OPTIMISTIC IO state, and the new request qualifies for optimistic IO, the process making the request inherits the open file's optimistic IO lease and is able to access the file in OPTIMISTIC IO state.

Figure 6:
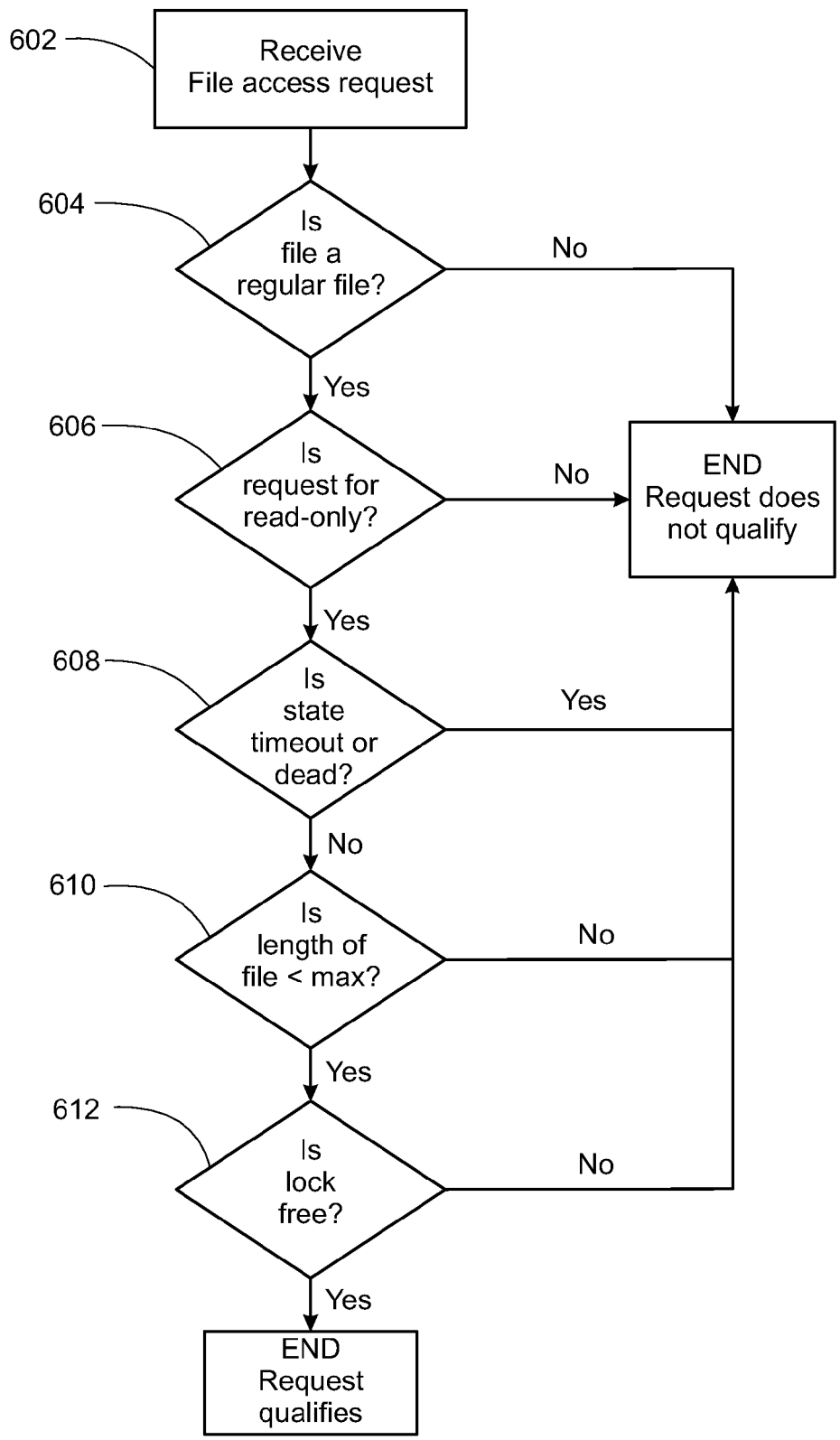
FIG. 6 is a flow chart illustrating an embodiment of a process for determining if a request qualifies for optimistic IO as shown in step 506 in FIG. 5 above.

FIG. 6 is a flow chart illustrating an embodiment of a process for determining if a request qualifies for optimistic IO as shown in step 506 above. At step 602, the file access request is received by the operating system 110. The file is checked to determine if it is a regular file at 604. If the file is not a regular file, i.e. if the file is a directory, symbolic link, device file, fifo, socket, etc, the file does not qualify for optimistic IO. If the file is a regular file, the process continues by determining at step 606 if the file request is an open request for read only. If the file access request is not for read only, the file does not qualify for optimistic IO. If the file request is a read only request then the process continues by determining if the state field 410 of the file Mode is TIMEOUT OR DEAD at 608. If the state field does not indicate TIMEOUT OR DEAD, then the process continues at step 610 by determining if the length of the requested file is less than a predetermined maximum length. Otherwise, the process ends because it is determined that the file request does not qualify for optimistic IO. It may be preferable to set maximum length to a value that is an integer multiple of the operating system's buffer cache block size, although this is not meant to be a limitation on the patented method. The patented invention applies equally well to other choices of maximum length. If it is determined that the length is less than a maximum length, then the process continues at 612 by reading the lock 205 and determining if the lock is free, for example by determining if the owner field is set to zero. If the lock is free, it is determined that the file request qualifies for optimistic IO. Otherwise, the process ends because it is determined that the file request does not qualify for optimistic IO. It would be understood by those of ordinary skill in the art that FIG. 6 is an illustration of one set of steps for determining if a file request would qualify for optimistic IO and that the invention may be implemented differently, for example with a different order of steps 604-612 or a subset of the steps 604-612.

The maximum length for a file to qualify for optimistic IO may be set based on a variety of factors including: the average file size expected to be serviced most frequently on a given file system volume; the granularity of the operating system buffer cache; the memory available on the host; and the size of a single buffer cache block. In some embodiments, maximum length may be set based on one of the above mentioned factors, or on a combination of more than one of the above mentioned factors. This list of factors is meant to illustrate examples used to determine the maximum length, and is not an exclusive list of factors. One of ordinary skill in the art would be able to determine other factors that may be used to set the maximum length based on the description provided.

In a preferred embodiment, the current version of the file's lock is read at 612 at the time the file is opened, and the value is stored in the memory of server 100. If the file qualifies for optimistic IO, a check is performed after the file has been read into cache at 507 to ensure that the lock version has not been changed, which would indicate another process has acquired the file lock. As explained above, the version field of a lock may be one of a number of different values, where the current value in the version field (i.e., the current version) indicates a temporally unique current state of the lock. Each time a lock is acquired or released, its version field is incremented as an atomic part of the lock acquisition and release process. In embodiments that include this determination, the file is not allowed to enter the OPTIMISTIC IO state if the version field of the file's lock has changed during the time the file was read into the cache. In other words, step 508 will not be executed, and the file's contents that were read at 507 will be evicted from the buffer cache.

Figure 7:
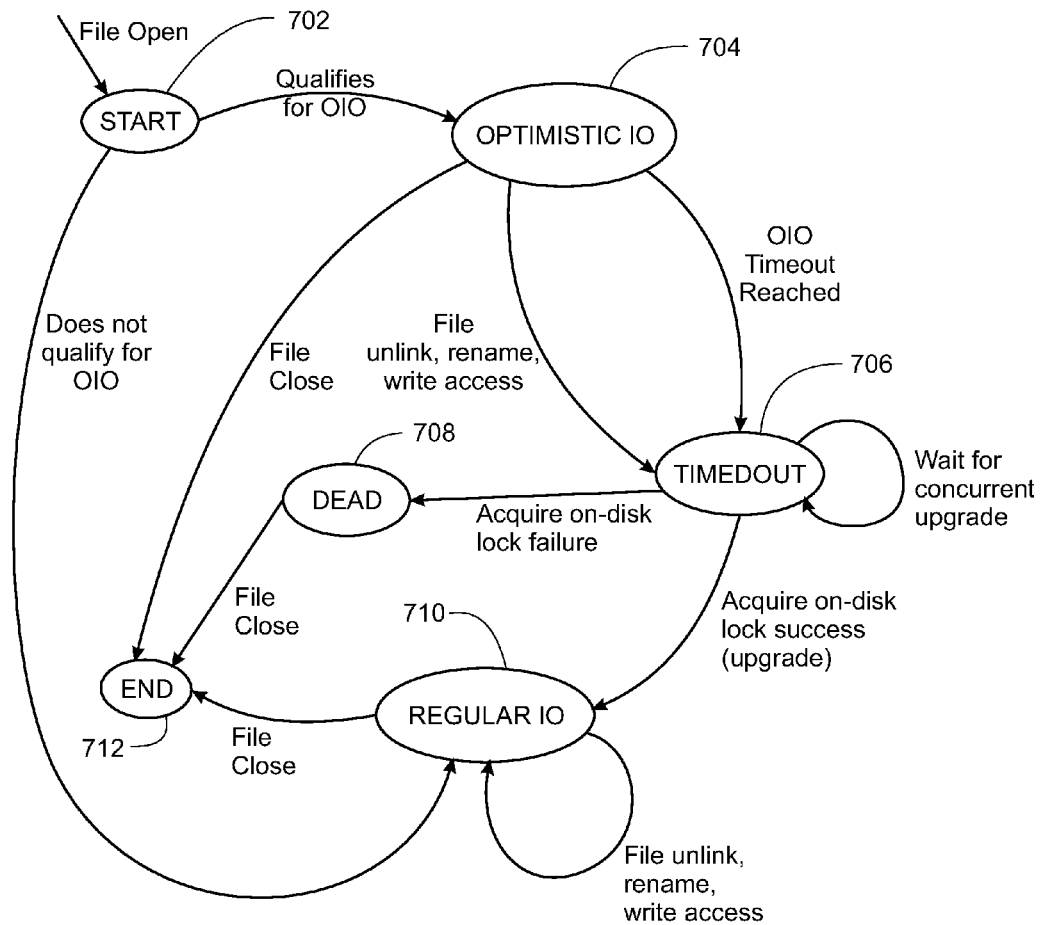
FIG. 7 illustrates an embodiment of a state machine for enabling optimistic IO leases on files hosted on a shared volume.

FIG. 7 illustrates an embodiment of a state machine for enabling optimistic IO leases on files hosted on a shared volume. In one embodiment, the state machine may be running inside the file system driver on each host in the cluster and may be implemented in a data structure stored in the file system driver. A shown at step 702, a file enters the state machine when there has been a file open request that has qualified for optimistic IO, for example as described above in reference to FIGS. 5 and 6. If the file did not qualify for optimistic IO, then the activities on the file would follow different state transitions, for example, the file might follow the START→REGULAR IO→END state transitions shown at 702, 710, and 712 respectively.

As illustrated at 704, if the file qualifies for optimistic IO, the state is set to OPTIMISTIC IO. When the file is in OPTIMISTIC IO state, the file is not locked on disk. In other words, if the file qualifies for OPTIMISTIC IO, the process does not attempt to acquire a lock. If the process is finished with the file while the file is in OPTIMISTIC IO, then the file closes and the state machine follows the state transitions of START→OPTIMISTIC IO→END as shown at 702, 704 and 712 respectively.

Prolonged operation in the OPTIMISTIC IO state may become unsafe. For example, there is a concern that another host might lock the file while it is in OPTIMISTIC IO, which would allow that process to change the file, for example by editing it or removing it while the local host is doing IO to the file optimistically. Therefore, it may be useful for the file to transition out of the OPTIMISTIC IO state after a period of time. This period of time may be referred to as the timeout and may be saved in the file INODE as discussed above with respect to FIG. 4 at 412.

There are a variety of different methods that may be used for determining the period of time for the timeout. Some examples of how a timeout may be set include setting a timeout per system or per file as may be determined by an administrator. The period of time used for the timeout may be determined by a variety of factors including the frequency at which non-IO file operations, such as rename, unlink, extend come in for a file. As will be understood by one of ordinary skill in the art, these are just examples of how the settings may be determined and a variety of other factors may be used.

As shown at 706, when a timeout occurs, the system moves to the TIMEDOUT state and initiates a request to acquire the on-disk lock. If the acquisition of the disk lock is successful, the file transitions to REGULAR IO state as shown at 710 and the file is now serviced using regular IO algorithms. If the acquisition is not successful, no further IO to the file is permitted and the file moves to the DEAD state as shown at 708.

It may be useful for the TIMEDOUT period to be set so that most state transitions will be from START→OPTIMISTIC IO→END without transitioning to a TIMEDOUT state and needing to acquire an on-disk lock.

Figure 8:
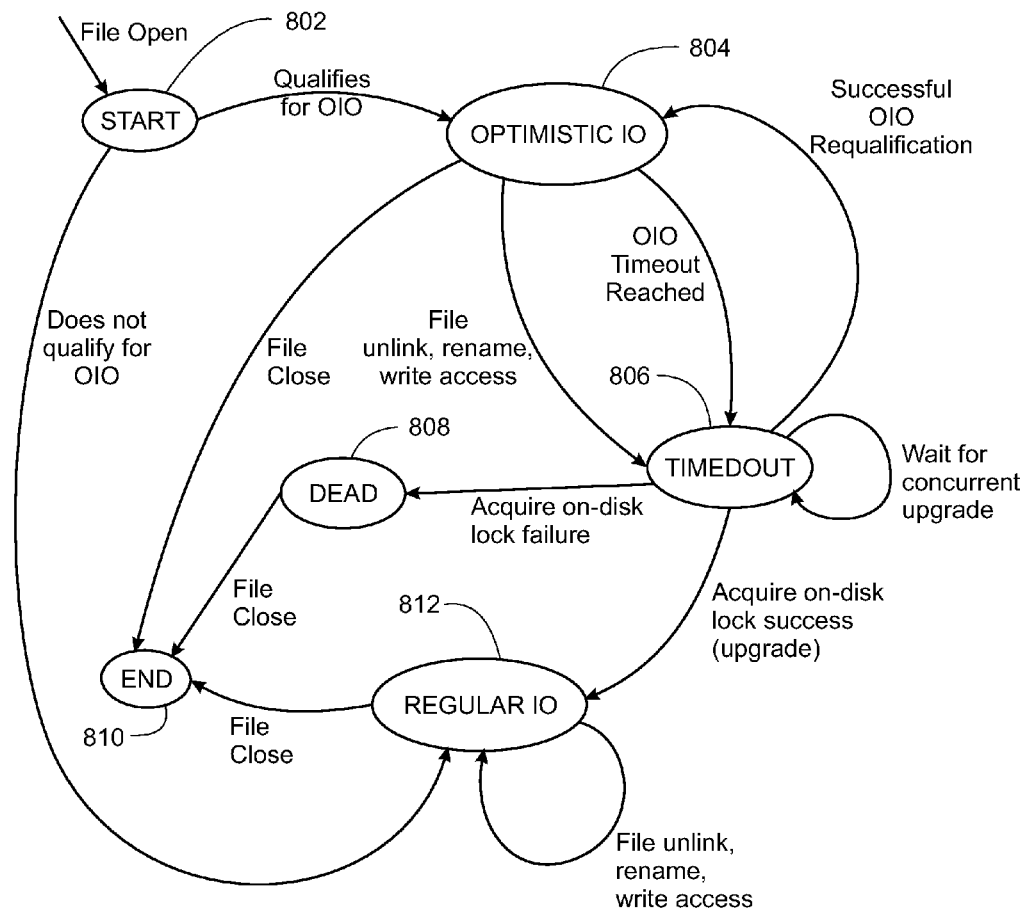
FIG. 8 illustrates an embodiment of a state machine for enabling extensions to the optimistic IO lease on files hosted on a shared volume.

FIG. 8 illustrates an embodiment of a state machine enabling optimistic IO leases for files hosted on a shared volume with an option for extending the optimistic IO lease and hence letting the file stay in the OPTIMISTIC IO state longer. In one embodiment, the state machine may be running inside the file system driver in the operating system on each host in the cluster. As shown at 802, a file enters the state machine when there has been an open request for it, and moves to the OPTIMISTIC IO state at 804 if it qualifies. If the file is still open when the timeout period has been reached, the file transitions to TIMEDOUT state at 806 where it is determined whether the file may requalify for OPTIMISTIC IO state, and thereby extend the OPTIMISTIC IO lease. If the requalification is successful, the file returns to the OPTIMISTIC IO state 804.

There are a variety of different factors that may be used to determine if a file may requalify for the OPTIMISTIC IO state, and thereby whether the requesting process may continue its OPTIMISTIC IO lease. In one embodiment, the current version field of the file's lock is read at the time of the file open request and stored in the memory of the host. Once the timeout period is reached, the current version field of the lock at that time is read and stored in the memory of the host. The two values are then compared, and if they are the same there, it implies that no other host modified the contents of the file while the local host had it open in the OPTIMISTIC IO state. This is a successful optimistic IO requalification and the file is allowed to continue in the OPTIMISTIC IO state. This process is represented by the following pseudo code, which is provided to illustrate one example of the process for determining whether a file requalifies for OPTIMISTIC IO. One of ordinary skill in the art would understand that the steps may be programmed in different ways.

```
V1 = current_lock_version;                        //read the version lock field and set V1 equal to the lock
                                                  version at the time of the file open
If (OPTIMISTIC_IO_QUALIFICATION = TRUE) {         //file qualifies for OPTIMISTIC IO
    read (file);                                  //put file in cache
    state = OPTIMISTIC IO;                        //set state to OPTIMISTIC IO
    timeout = TIMEOUT;                            //set the period for timeout
    START_TIMER;                                  // start the timer
```

```
serviceIO:
    ...                                             //service IO operations to the file
    If (Timer=TIMEOUT) {                            // the timeout period has been reached
        state=TIMEDOUT;
        V2 = current_lock_version;                  //read the version lock field and set V2 to it
        If (V1 = V2) {                              // no one has acquired a lock since the file open
            State = OPTIMISTIC IO;                  //file requalifies for OPTIMISTIC IO and transitions back
            Timeout = TIMEOUT;                      //period of time before next timeout is TIMEOUT
            START_TIMER;                            // restart the timer;
            goto serviceIO;
        }
    }
}
```

In another embodiment, at the time the file is opened, the mtime value for the file is read and stored. The mtime value for a file is a term used to indicate the last time the file was modified. Once the timeout period is reached, the value of mtime at that time is read and stored. The two mtime values are then compared and if they are the same, there is a successful optimistic IO requalification and the file is allowed to continue in the OPTIMISTIC IO state. This process is represented by the following pseudo code, which is provided to illustrate one example of the process for determining whether a file requalifies for OPTIMISTIC IO. One of ordinary skill in the art would understand that the steps may be programmed in different ways.

be shown by a simple variation to the pseudo code shown above in the discussion of using mtime, with ctime substituted for mtime.

In another embodiment, an additional field is stored in the file disk lock which contains the value of the lock version at the time of the most recent file metadata or file data change. This value may be referred to as a "content ID" of the file. The content ID, unlike the lock version, is only incremented when there is an actual mutation of the file or the file metadata, but is not incremented when there is only a read event. At the time the file is opened, the content ID value is read and stored.

```
M1 = current_mtime;                                 //read the mtime value at the time the file is opened and set
                                                    M1 equal to that value
If (OPTIMISTIC_IO_QUALIFICATION = TRUE) {           //file qualifies for OPTIMISTIC IO
    read (file);                                    //put file in cache
    state = OPTIMISTIC IO;                          //set state to OPTIMISTIC IO
    timeout = TIMEOUT;                              //set the period for timeout
    START_TIMER;                                    // start the timer
serviceIO:
    ...                                             //service IO operations to the file
    If (Timer=TIMEOUT) {                            // the timeout period has been reached
        state=TIMEDOUT;
        M2 = current_mtime;                         //read the current mtime value and set M2 to it
        If (M1 = M2) {                              // no one has modified file contents since the file open
            State = OPTIMISTIC IO;                  //file requalifies for OPTIMISTIC IO and transitions back
            Timeout = TIMEOUT;                      //period of time before next timeout is TIMEOUT
            START_TIMER;                            // restart the timer;
            goto serviceIO;
        }
    }
}
```

In another embodiment, at the time the file is opened, the ctime value for the file is read and stored. The ctime value for a file is a term used to indicate the last time the file metadata (e.g., file length, file access permissions, etc) was modified. Once the timeout period is reached, the value of ctime at that time is read and stored. The two ctime values are then compared and if they are the same, there is a successful OPTIMISTIC IO requalification and the file is allowed to continue in the OPTIMISTIC IO state. An example of implementing the process for using ctime to determine requalification could Once the timeout period is reached, the value of the content ID at that time is read and stored. The two content ID values are then compared and if they are the same, there is a successful optimistic IO requalification and the file is allowed to continue in the OPTIMISTIC IO state. This process is represented by the following pseudo code, which is provided to illustrate one example of the process for determining whether a file requalifies for optimistic IO. One of ordinary skill in the art would understand that the steps may be programmed in different ways.

```
CID1 = current_content_ID;                          //read the content ID value at the time the file is opened and
                                                    set CID1 equal to that value
If (OPTIMISTIC_IO_QUALIFICATION = TRUE) {           //file qualifies for OPTIMISTIC IO
    read (file);                                    //put file in cache
```

```
            state = OPTIMISTIC IO;                    //set state to OPTIMISTIC IO
            timeout = TIMEOUT;                        //set the period for timeout
            START_TIMER;                              // start the timer
    serviceIO:
        ...                                           //service IO operations to the file
        If (Timer=TIMEOUT) {                          // the timeout period has been reached
            state=TIMEDOUT
            CID2 = current_content_ID;                //read the content ID field and set CID2 to it
            If (CID1 = CID2) {                        // no one has changed file contents since the file open
                State = OPTIMISTIC IO;                //file requalifies for OPTIMISTIC IO and transitions back
                Timeout = TIMEOUT;                    //period of time before next timeout is TIMEOUT
                START_TIMER;                          // restart the timer;
                goto serviceIO;
            }
        }
    }
```

In another embodiment, a checksum is calculated on the file contents at the time of opening the file. The value of the checksum is computed as the hash value of the data contents of the file at that point in time. Once the timeout period is reached, a new checksum is calculated for the file. The two values are then compared and if they are the same, there is a successful OPTIMISTIC IO requalification and the file is allowed to continue in the OPTIMISTIC IO state. This process is represented by the following pseudo code, which is provided to illustrate one example of the process for determining whether a file requalifies for OPTIMISTIC IO. One of ordinary skill in the art would understand that the steps may be programmed in different ways. In some embodiments, the checksum may be stored as an added field in the file descriptor. The file system driver in the operating system will recalculate and write a new checksum to this field along with data writes to the file.

IO algorithms. File open and IO requests should only be allowed to disk while the file is in either the OPTIMISTIC IO state or the REGULAR IO state.

Figure 9:
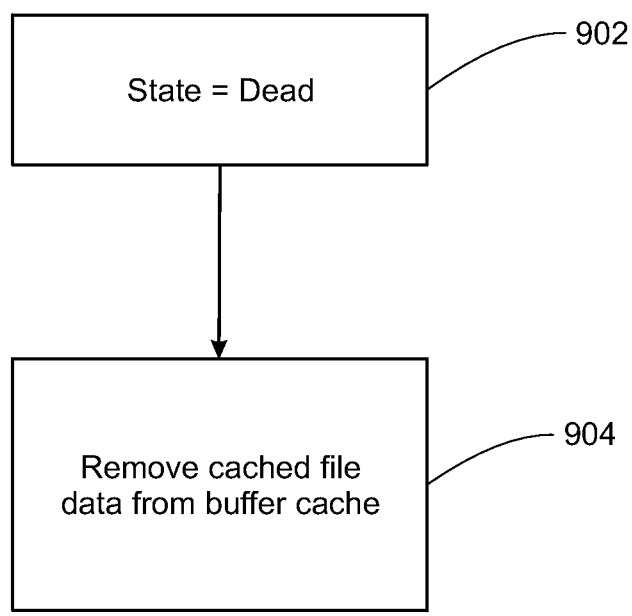
FIG. 9 is a flow chart illustrating the process for moving a file into the DEAD optimistic IO state.

If the file does not acquire the on-disk lock, the state is changed to DEAD as shown at 808. FIG. 9 is a flow chart illustrating the process for moving a file into the DEAD state. At step 902, the state of the file is set to dead. The operating system might still have cached file contents in the buffer cache that must be deleted. One embodiment for deleting the file contents in the buffer cache involves creating an interface to the buffer cache whereby the OPTIMISTIC IO state machine at the time of transitioning to the DEAD state can make a call to the buffer cache to remove all data buffers belonging to the file. Step 904 illustrates this call. Because all cached data buffers for the file are removed from the buffer cache once the file is in the DEAD state and because the only way to access the file's contents is to use the file system's file

```
    CS1 = checksum(file);                             //calculate checksum of file data at the time the file is opened
                                                      and set CS1 equal to that value
    If (OPTIMISTIC_IO_QUALIFICATION = TRUE) {         //file qualifies for OPTIMISTIC IO
        read (file);                                  //put file in cache
        state = OPTIMISTIC IO;                        //set state to OPTIMISTIC IO
        timeout = TIMEOUT;                            //set the period for timeout
        START_TIMER;                                  // start the timer
    serviceIO:
        ...                                           //service IO operations to the file
        If (Timer=TIMEOUT) {                          // the timeout period has been reached
            state=TIMEDOUT
            CS2 = checksum(file);                     //calculate checksum of file data and set CS2 to it
            If (CS1 = CS2) {                          // no one has changed file data since the file open
                State = OPTIMISTIC IO;                //file requalifies for OPTIMISTIC IO and transitions back
                Timeout = TIMEOUT;                    //period of time before next timeout is TIMEOUT
                START_TIMER;                          // restart the timer;
                goto serviceIO;
            }
        }
    }
```

One of ordinary skill in the art would understand that the above embodiments to determine if the file requalifies for optimistic IO may be combined in different ways. For example, a file system driver can choose to implement a combination of lock version and content ID checks to determine if a file requalifies for optimistic IO. If the file cannot requalify for optimistic IO, then the file attempts to move into the REGULAR IO state and there is a determination of whether the process can acquire a file lock. As shown in FIG. 8 at 812 if the file does acquire the on-disk lock, the state is changed to REGULAR IO. As explained above, when the file is in the REGULAR IO state, the file is serviced using regular IO function, the operating system will not be able to service any further file IO requests without the knowledge of the OPTIMISTIC IO machine, thereby preventing IO requests to the file when it is in the DEAD state. In one embodiment, a NO_CONNECT indication will be returned to the caller whose file is in a DEAD state.

In some embodiments in which files may requalify for optimistic IO, a queue may be used to store any file open or IO requests that are received while the file is in the TIMEDOUT state; i.e. before the file has either transitioned back to the OPTIMISTIC IO state, or transitioned to the REGULAR IO or DEAD state. As is well known in the art, the queue may be implemented as any First-In-First-Out (FIFO) data structure, such as a linked list or circular buffer. The queue may be stored as an additional data structure in the file system driver on the host or at any one place that can be easily accessed by the state machine. Once the file has transitioned to the next state, i.e., OPTIMISTIC IO, REGULAR IO, or DEAD, the file open and IO requests are dequeued and processed as they would have been processed if the file had been in that state when the request was received.

A system and method of accessing data in a clustered file system has been disclosed. The method allows for IO requests without acquiring a clustered file system lock.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method for performing I/O operations on a file stored in a file system utilizing a shared data storage system and accessible by a plurality of host computers wherein any of the host computers are capable of acquiring a lock from the file system to exclusively access the file, the method comprising:
   receiving from a process executing on one of the host computers, a request to read data stored in the file;
   requesting, by the host computer, the data stored in the file without acquiring a lock from the file system to access the file;
   maintaining, in the memory of the host computer, a timeout value associated with the file while the data is being read by the host computer;
   receiving by the host computer at least a portion of the data prior to an expiration of time as indicated by the timeout value; and
   if all the data has not been received by the host computer before the expiration of time,
      assessing, by the host computer upon the expiration of time, whether another of the host computers has acquired a lock on the file, and
      invalidating, by the host computer, the received data without providing the received data to the requesting process if another of the host computers has acquired a lock on the file.

2. The method of claim 1, wherein the timeout value is specified to increase a likelihood that all of the data will be received prior to the expiration of time.

3. The method of claim 2, wherein the data is requested by the host computer without obtaining a lock only if the file is less than a predetermined size, wherein the predetermined size is specified to further increase the likelihood that all of the data will be received prior to the expiration of time.

4. The method of claim 1, wherein acquiring a lock to the file comprises writing a unique identifier into metadata relating to the file and stored in the shared data storage system.

5. The method of claim 1, further comprising acquiring the lock upon the expiration of time to continue receiving the data from the file if the lock has not been acquired by another of the host computers.

6. The method of claim 1, further comprising resetting the timeout value upon the expiration of time to continue receiving the data from the file if the lock has not been acquired by another of the host computers.

7. The method of claim 1, wherein invalidating the received data comprises invalidating a cache buffer containing the received data that is utilized by a file system driver on the host computer.

8. A computer-readable storage medium embodying program instructions for performing I/O operations on a file stored in a file system utilizing a shared data storage system and accessible by a plurality of host computers wherein any of the host computers are capable of acquiring a lock from the file system to exclusively access the file, the program instructions causing a processor on one of the host computers to perform the steps of:
   receiving from a process executing on the host computer, a request to read data stored in the file;
   requesting, by the host computer, the data stored in the file without acquiring a lock from the file system to access the file;
   maintaining, in the memory of the host computer, a timeout value associated with the file while the data is being read by the host computer;
   receiving by the host computer at least a portion of the data prior to an expiration of time as indicated by the timeout value; and
   if all the data has not been received by the host computer before the expiration of time,
      assessing, by the host computer upon the expiration of time, whether another of the host computers has acquired a lock on the file, and
      invalidating, by the host computer, the received data without providing the received data to the requesting process if another of the host computers has acquired a lock on the file.

9. The computer-readable storage medium of claim 8, wherein the timeout value is specified to increase a likelihood that all of the data will be received prior to the expiration of time.

10. The computer-readable storage medium of claim 9, wherein the data is requested by the host computer without obtaining a lock only if the file is less than a predetermined size, wherein the predetermined size is specified to further increase the likelihood that all of the data will be received prior to the expiration of time.

11. The computer-readable storage medium of claim 8, wherein acquiring a lock to the file comprises writing a unique identifier into metadata relating to the file and stored in the shared data storage system.

12. The computer-readable storage medium of claim 8, wherein the program instructions further cause the processor to perform the step of acquiring the lock upon the expiration of time to continue receiving the data from the file if the lock has not been acquired by another of the host computers.

13. The computer-readable storage medium of claim 8, wherein the program instructions further cause the processor to perform the step of resetting the timeout value upon the expiration of time to continue receiving the data from the file if the lock has not been acquired by another of the host computers.

14. The computer-readable storage medium of claim 8, wherein invalidating the received data comprises invalidating a cache buffer containing the received data that is utilized by a file system driver on the host computer.

15. A host computer configured to perform I/O operations on a file stored in a file system utilizing a shared data storage system and accessible by a plurality of host computers wherein any of the host computers are capable of acquiring a lock from the file system to exclusively access the file, the host computer comprising a processor configured to perform the steps of:
- receiving from a process executing on the host computer, a request to read data stored in the file;
- requesting, by the host computer, the data stored in the file without acquiring a lock from the file system to access the file;
- maintaining, in the memory of the host computer, a timeout value associated with the file while the data is being read by the host computer;
- receiving by the host computer at least a portion of the data prior to an expiration of time as indicated by the timeout value; and
- if all the data has not been received by the host computer before the expiration of time,
  - assessing, by the host computer upon the expiration of time, whether another of the host computers has acquired a lock on the file, and
  - invalidating, by the host computer, the received data without providing the received data to the requesting process if another of the host computers has acquired a lock on the file.

16. The host computer of claim 15, wherein the timeout value is specified to increase a likelihood that all of the data will be received prior to the expiration of time.

17. The host computer of claim 16, wherein the data is requested by the host computer without obtaining a lock only if the file is less than a predetermined size, wherein the predetermined size is specified to further increase the likelihood that all of the data will be received prior to the expiration of time.

18. The host computer of claim 15, wherein acquiring a lock to the file comprises writing a unique identifier into metadata relating to the file and stored in the shared data storage system.

19. The host computer of claim 15, wherein the processor is further configured to perform the step of acquiring the lock upon the expiration of time to continue receiving the data from the file if the lock has not been acquired by another of the host computers.

20. The host computer of claim 15, wherein the processor is further configured to perform the step of resetting the timeout value upon the expiration of time to continue receiving the data from the file if the lock has not been acquired by another of the host computers.

* * * * *